United States Patent [19]

Rodgers

[11] 3,968,897
[45] July 13, 1976

[54] PRESSURE-VACUUM RELIEF VALVE ASSEMBLY

[75] Inventor: Robert E. Rodgers, Connersville, Ind.

[73] Assignee: Stant Manufacturing Company, Inc., Connersville, Ind.

[22] Filed: Oct. 30, 1974

[21] Appl. No.: 519,350

Related U.S. Application Data

[63] Continuation-in-part of Ser. No. 485,350, July 3, 1974, Pat. No. 3,929,158.

[52] U.S. Cl. .............................. 220/204; 137/525; 137/493.9
[51] Int. Cl.² ........................................ F16K 17/18
[58] Field of Search ............. 137/493.9, 493.2, 493, 137/512.2, 102, 525, 525.1, 587, 588, 493.8; 220/204, 203, 208

[56] References Cited
UNITED STATES PATENTS

| | | | |
|---|---|---|---|
| 1,563,144 | 11/1925 | Baker .............................. | 137/493.9 X |
| 2,423,281 | 7/1947 | Aspelin ............................. | 137/493.8 |
| 2,460,397 | 2/1949 | Roth ................................. | 137/493.8 |
| 2,986,159 | 5/1961 | Snyder .............................. | 137/493 |
| 3,032,060 | 5/1962 | Huffman .......................... | 137/516.15 |
| 3,403,696 | 10/1968 | Pynchon .......................... | 137/516.13 |
| 3,439,873 | 4/1969 | Rolf .................................. | 137/493.9 X |
| 3,706,362 | 12/1972 | Faure ............................... | 137/493.8 X |

FOREIGN PATENTS OR APPLICATIONS

| | | | |
|---|---|---|---|
| 1,205,726 | 4/1958 | France .............................. | 137/493.8 |
| 711,198 | 6/1954 | United Kingdom ............. | 137/493.9 |

*Primary Examiner*—Martin P. Schwadron
*Assistant Examiner*—Robert J. Miller
*Attorney, Agent, or Firm*—Jenkins, Hanley & Coffey

[57] ABSTRACT

A safety-pressure-vacuum relief valve assembly for vehicle fuel tanks and the like which is adapted either to be mounted at an external point on the vehicle and connected to the interior of the tank by a conduit or to be a part of the cap for the conventional tank filler neck. The assembly comprises a fitting having an upwardly facing annular flange area concentric with the axis of the fitting, a circular plate concentrically resting on the flange, an inverted cup providing a peripheral skirt having a concentric and peripherally extending shoulder above the flange, the cup and fitting being secured against axial separation to capture the said plate therebetween, and an annular flexible gasket having an outer peripheral portion gripped between the plate and the shoulder of the cup and an inner peripheral bead engaging the upper surface of the plate normally to close pressure relief openings in the plate. A spring loaded valve plate urges the radially inward portion of the gasket against the upper surface of the plate. The center of the plate is provided with a vacuum valve opening extending therethrough which is normally closed by a vacuum valve member. The fitting is either connected to the interior of the tank by means of a flexible conduit or the fitting is firmly engaged by the skirt of a filler cap outer shell, in which case the fitting provides an opening through which the valve assembly communicates with the interior of the tank.

6 Claims, 3 Drawing Figures

PRESSURE-VACUUM RELIEF VALVE ASSEMBLY

This is a continuation-in-part application based upon my pending application Ser. No. 485,350 filed July 3, 1974, now U.S. Pat. No. 3,929,158.

The present invention relates to pressure-vacuum relief valve systems primarily intended for use in connection with vehicle fuel tanks and the like. One objective of the invention is to provide an assembly which may be located outside the vehicle at a point remote from the tank, which communicates with the interior of the tank at a point remote from the conventional filler neck of the tank and which will automatically relieve superatmospheric pressure within the tank when it rises above a predetermined value and automatically relieve subatmospheric pressure within the tank when it falls below a predetermined value. Another object of the invention is to provide such a valve assembly for venting the interior of the tank which is located in the filler cap itself to be mounted on the filler neck.

A principal object of the invention, therefore, is to provide a valve assembly having constructional features such that it may be mounted remotely from the filler neck or built into the filler cap which closes the filler neck. An important feature of this assembly is the manner in which the outer peripheral portion of the annular, flexible pressure valve gasket is gripped between the outer periphery of a valve plate and the skirt of an inverted cup to provide a seal between the plate and the cup. This valve plate, which is preferably a circular, generally flat plate, rests concentrically upon an annular flange of a fitting, the plate having pressure vent openings and vacuum vent openings extending axially therethrough. Means is provided for securing the fitting and the said inverted cup against axial separation to capture the plate therebetween.

There are some disadvantages involved in having the venting valve system built into the filler cap. First of all, such caps are necessarily subject to frequent handling since they must be bodily removed from the filler neck when fuel is added to the tank. Some filling station attendants are notoriously careless, frequently dropping the caps, sometimes failing to replace them securely, and sometimes wholly forgetting to replace them at all. Such careless handling often damages the valving mechanism in such a way that damage is not readily perceptible; but such damage may significantly affect the supplying of fuel to the engine, as may an insecure replacement of a valved cap onto the filler neck. Loss of a valved cap, which almost invariably results when the attendent fails to replace it, requires, of course, the purchase of a new one; and properly constructed valved filler neck cap is relatively expensive.

Furthermore, in present-day automobiles, the distal end of a fuel tank filler neck is frequently located in an enclosed space into which the escape of fuel fumes, when internal tank pressures rise above the predetermined value, may be dangerous.

The present invention, therefore, contemplates the location of a pressure-vacuum relief system at a point suitably remote from the tank and from the filler neck of the tank so that, if desired, the filler neck closure may be a simple, unvalved cap. The present invention also contemplates the provision of a pressure-vacuum relief valve assembly which can, if desired, be located in the cap itself to be placed upon the filler neck. While there are some disadvantages, as pointed out above, there are some advantages to having the valve in the cap itself which may, in some instances, override the disadvantages, particularly if the valve assembly is constructed such that it is quite rugged so that it will not be damaged by careless handling. By including such a rugged valve assembly within the cap itself, the cost of the remote assembly and the connecting tube and the mounting bracket for the remote assembly can be eliminated.

Further objects of the invention will appear as the description proceeds.

To the accomplishment of the above and related objects, this invention may be embodied in the forms illustrated in the accompanying drawings, attention being called to the fact, however, that the drawings are illustrative only, and that change may be made in the specific constructions illustrated and described, so long as the scope of the appended claims is not violated.

Figure 1:
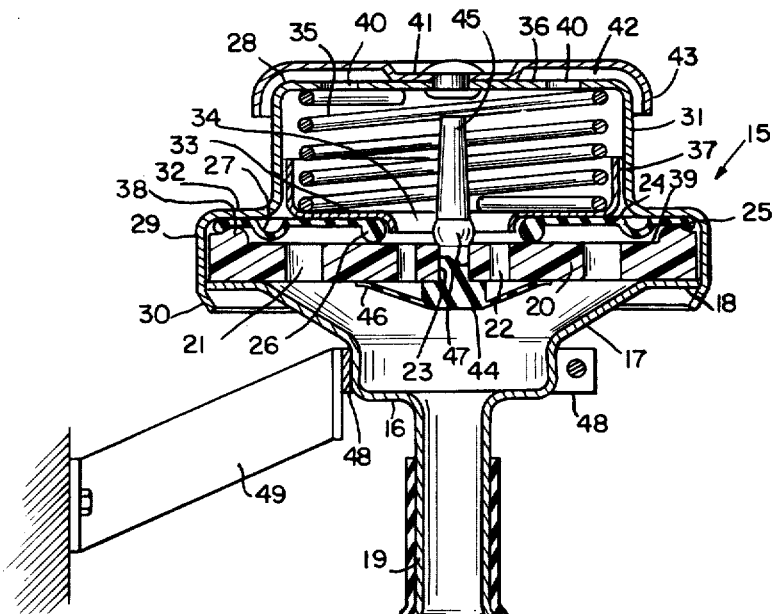
FIG. 1 is a more or less diagrammatic illustration of a remote valving system constructed in accordance with the present invention and associated with a conventional vehicle fuel tank.
Figure 1:
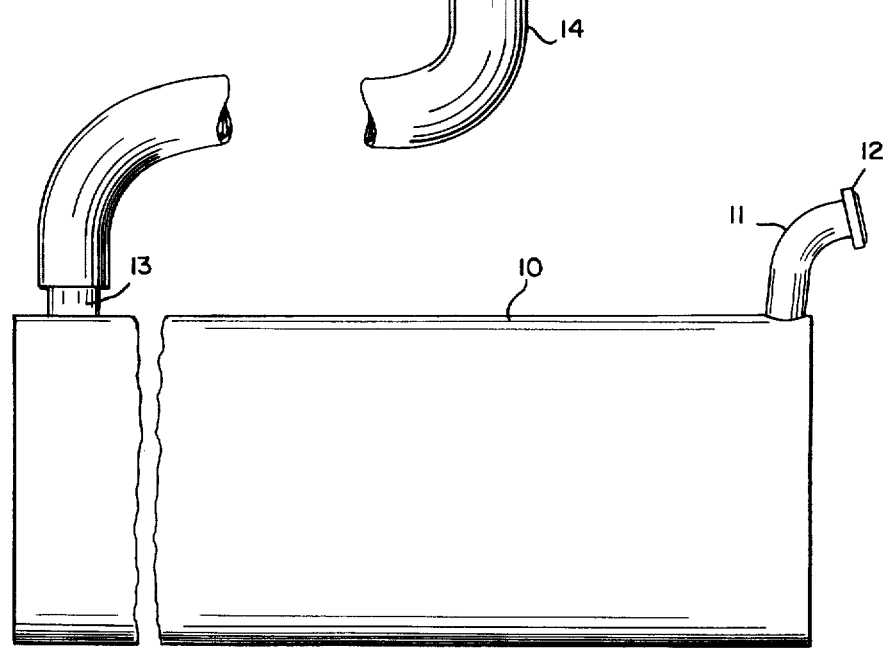

As shown in FIG. 1, the tank 10 is provided near one end with an upstanding filler neck 11 which is normally closed by a suitable cap 12. Near the other end of the tank, a fitting 13 enters the tank and a suitable conduit 14 is connected to the fitting 13 and leads to the safety pressure-vacuum relief assembly indicated generally by the reference numeral 15.

The assembly 15 comprises a tubular fitting 16 having a flared upper end 17 which terminates in a substantially flat peripheral flange 18 which is disposed in a plane substantially perpendicular to the axis of the fitting 16. The fitting 16 has a reduced lower end 19 suitably shaped for reception of the conduit 14.

A substantially flat plate 20, preferably but not necessarily formed from plastic material, is peripherally congruent with the flange 18 upon which it rests. Said plate 20 is formed with a first plurality of openings 21 all of which are radially spaced from the center of the plate by at least a first dimension and which may preferably be arranged in a common circle uniformly spaced from said center. At a lesser distance from the plate center, the plate is formed with one or more apertures 22 therethrough, and the plate is centrally perforated as at 23.

Resting upon the upper surface of the plate 20 is a flexible, annular gasket 24 having an outer peripheral bead 25 and an inner peripheral bead 26 with a weakened flexure region 27 therebetween. This region 27 permits free movement of the bead 26 relative to the outer peripheral portion of the gasket 24.

An inverted cup 28 is formed with a peripheral skirt 29 which encompasses the gasket 24, the plate 20 and the flange 18; and the illustrative skirt 29 is deformed as at 30 to hold the cup 28 and the flange 18 against axial separation. This method of securing the cup 28 and flange 18 is merely illustrative, and it will be appreciated that various methods may be used firmly to secure the cup and flange against separation or relative movement. The cup 28 is formed to provide a reduced, upstanding base 31 which, with the skirt 29, defines a downwardly-facing shoulder 32.

As will be readily perceived, the parts thus far described are so proportioned and designed that the bead 25 of the gasket 24 is gripped between the shoulder 32 and the outer region of the plate 20, the weakened gasket portion 27 is free and the gasket bead 26 is disposed between the openings 21 and the apertures 22. A seal plate 33 formed with a central aperture 34 provides an upturned flange 37 which is guidingly received within the base 31 of the cup 28. The plate 33 bears upon the internal region of the gasket 24 and is resiliently urged toward the plate 20 by a spring 35 confined between the seal plate and the floor 36 of the cup 31. Thus, the gasket bead 26 is yieldably held normally in sealing engagement with the upper surface 39 of the plate 20.

Preferably, an upstanding bead 38 is formed near the outer periphery of the upper surface 39 of the plate 20 so that the gasket bead 25 is located radially outwardly with respect to said bead 38 to guard affirmatively against slippage of the outer periphery of the gasket 24.

The floor 36 of the cup 31 is ported as at 40 and a shield 41 is suitably centrally secured externally to the cup floor 36, said shield being so shaped that it is spaced axially as at 42 from the cup floor in the ported region of said cup floor. The shield is preferably further formed with a downturned peripheral skirt 43 which is similarly spaced from the peripheral wall of the cup base 31.

The floor 36 of the cup 31 is ported as at 40 and a shield 41 is suitably centrally secured externally to the cup floor 36, said shield being so shaped that it is spaced axially as at 42 from the cup floor in the ported region of said cup floor. The shield is preferably further formed with a downturned peripheral skirt 43 which is similarly spaced from the peripheral wall of the cup-base 31.

A rubberoid umbrella valve 44 is formed to provide a stem 45 and a flexible peripheral region 46. The stem 45 is projectable through the central aperture 23 of the plate 20 and preferably is formed with a compressible protuberance 47 which, when it has passed through the aperture 23, retains the stem 45 against axial movement relative to the plate 20.

Any suitable means is provided for securing the assembly at any selected point to a vehicle chassis or body such as, for instance, the clamp 48 carried upon a bracket 49.

Normally, of course, the parts of the above-described assembly will occupy the positions illustrated in the drawing in which fluid cannot pass the plate 20 in either direction. If the internal pressure within the tank 10 rises above the value which is predetermined by the characteristics of the selected spring 35, that pressure acting upon the under surface of the gasket 24 will lift the bead 26 and the seal plate 33 against the tendency of the spring to permit fluid to flow from the conduit 14 through the openings 21, past the bead 26, through the aperture 34 and through the ports 40 to atmosphere. When the pressure within the tank has thus been relieved to the above-mentioned predetermined value, the spring 35 will again seat the bead 26 on the upper surface of the plate 20 to stop such flow.

When the pressure within the tank 10 falls below a predetermined subatmospheric value, as determined by the characteristics of the flexible portion 46 of the valve 44, the pressure differential, acting through the apertures 22, will lift the periphery of the umbrella valve 44 off the lower surface of the plate 20 to permit air to flow through the assembly and the conduit 14 to the interior of the tank 10. When the vacuum within the tank has been sufficiently relieved, the inherent resiliency of the flexible portion 46 of the valve 44 will cause the valve periphery to return to sealing engagement with the under surface of the plate 20.

Figure 2:
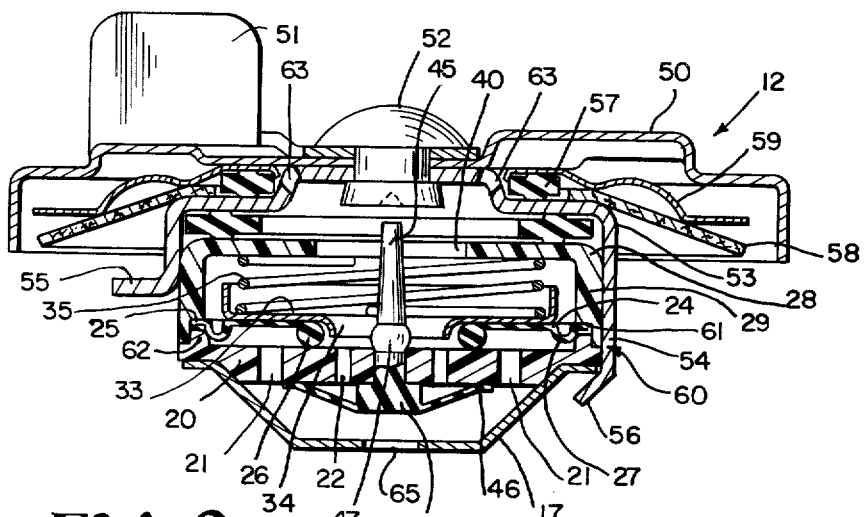
FIG. 2 is a sectional view of a filler cap with the valve assembly of the present invention built therein.
Figure 3:
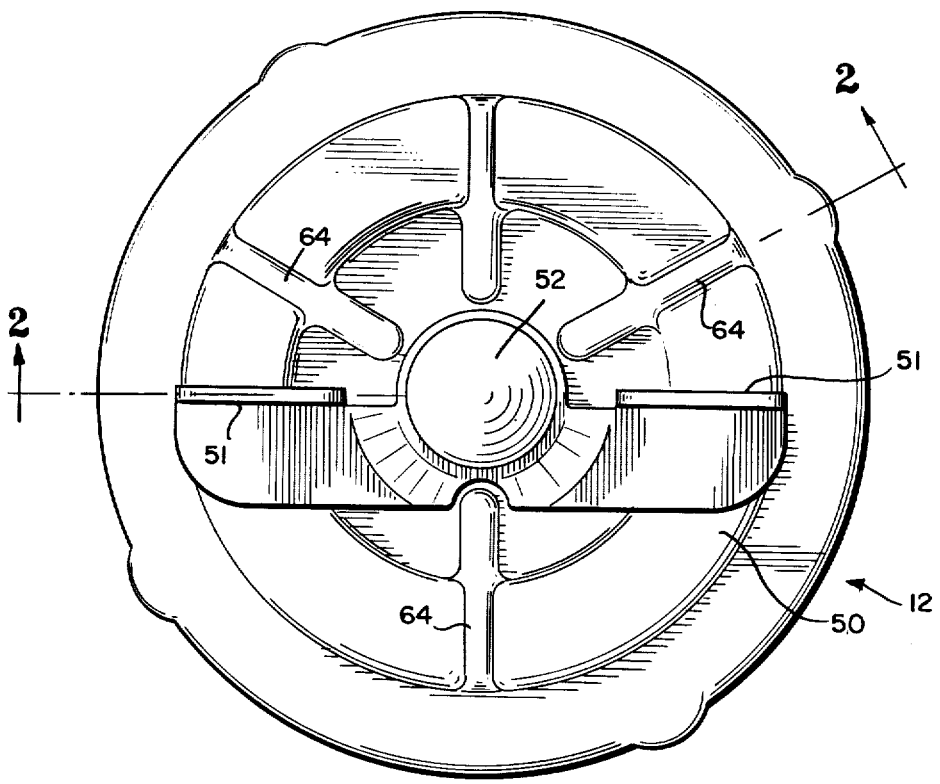
FIG. 3 is a top view of the cap of FIG. 2.

Referring now to FIGS. 2 and 3 in which like reference numerals represent like parts, the valve assembly is shown built into the cap indicated generally by the reference numeral 12. The cap comprises the usual cap cover 50 having handle flanges 51 mounted thereon usually by spot welding techniques and a concentric rivet 52 which secures the cover to the conventional outer shell 53 having a depending skirt 54 conventionally formed with radially outwardly extending bayonet fasteners 55. In the illustration, the distal edge or lower edge of the skirt 54 is provided with a turned-in tab 56 which serves to secure the valve assembly in the cap. It will be appreciated that this is merely illustrative and that the valve assembly may be secured into the shell 53 by any number of different methods. It will suffice to say, therefore, that the assembly includes means for securing the fitting 17 and the cup 28 against axial separation. Of course, the illustrative cap 12 is to be placed upon a filler neck providing a locking cam profile to be engaged by the bayonet connecting means 55.

Conventionally captured between the shell 53 and the cover 50 are the usual inner gasket 57, outer gasket 58 and diaphragm spring 59 which serve to provide a seal between the shell 53 and the filler neck. The filler neck is conventionally provided with a peripherally extending and outwardly facing sealing surface to be engaged by the gasket 58.

In the illustrative embodiment of FIG. 2, the inverted cup 28 as well as the valve plate 20 may be formed from plastic and they may be bonded together as indicated at 60 by ultrasonic bonding techniques or other suitable bonding techniques. The connection indicated at 60 may, in some cases, simply be a snap connection in that the skirt 29 of the cup 28 may be provided with a groove into which a ridge on the plate 20 snaps or vice-versa.

Further, the connection between the plate 20 and the inverted cup 28 may be secured by, for instance, the tabs 56 which secure the fitting 17 against axial separation from the cup to capture the plate 20 between the fitting 17 and the cup.

Further, in the illustrative embodiment of FIG. 2, the skirt 29 of the inverted cup 28 is formed with a downwardly and inwardly opening rabbet providing a peripherally extending, downwardly facing shoulder 61 just above and in registry with a peripherally and upwardly extending bead 62 provided on the plate 20. The outer gasket bead 25 is captured between the shoulder 61 and the bead 62 to be firmly gripped there to provide a peripheral seal between the plate 20 outer edge and the cup 28.

The valve assembly of FIGS. 2 and 3 functions in the same manner as the valve assembly shown and described in conjunction with FIG. 1. The inverted cup 28 in FIG. 2 is provided with a central larger opening 40 in its base rather than the plurality of openings shown in FIG. 1. Further, the shell 53 is provided with vent openings such as indicated at 63 which are in communication with inverted troughs 64 formed in the cover 50 to extend radially outwardly beyond the extent of the diaphragm spring 59. Thus, fluid moving through the valve assembly moves through the opening 40, vent opening 63 and troughs 64.

The fitting 17 is similarly provided with a central opening 65 through which fluid flows to and from the valve assembly. In the embodiments of FIGS. 2 and 3, the fitting 17, which is inserted downwardly into the filler neck, provides the communication to the interior of the tank through the opening 65 and the fitting also serves to protect the valve assembly against damage by careless handling. The fitting 17 may be made from a relatively tough corrosion resistant steel such that the cap 12 can be dropped without damaging the valve assembly.

I claim as my invention:

1. A safety pressure-vacuum relief cap for closing the filler neck of vehicle fuel tanks and the like comprising a fitting having a upper end and a lower end and having an upwardly facing substantially flat flange circumscribing its upper end and disposed in a plane substantially perpendicular to the axis of said fitting, a generally circular plate resting on and peripherally substantially congruent with said flange, said plate having a plurality of openings axially therethrough, each of said openings being disposed at at least a first radial distance from the center of said plate, said plate also having at least one aperture extending axially therethrough at a radial distance from said plate center less than said first distance, an inverted cap having a peripheral skirt, defining an annular shoulder, defining an annular, flexible gasket having an outer peripheral bead gripped between said plate and said shoulder and an inner peripheral bead engaging the upper flat surface of said plate in an annular area disposed between said first distance and said lesser distance, an outer shell for said cup providing means for engaging the filler neck and providing means for holding said fitting and said cup against axial separation, a seal plate having a central aperture and bearing on a radially inward region of the upper surface of said gasket, spring means confined between the floor of said cup base and said seal plate to urge said gasket inner peripheral bead into yieldable sealing contact with the upper surface of said plate to provide a pressure valve for the tank, a rubberoid umbrella valve having a stem centrally penetrating and axially fixed relative to said plate and having its flexible outer peripheral region normally in sealing engagement with the lower surface of said plate in an annular region disposed between said first distance and said lesser distance to provide a vacuum valve for the tank, and said lower end of said fitting being ported to provide communication with the interior of a fuel tank for such a vehicle, and said cup and said outer shell being ported to provide communication with the atmosphere.

2. The assembly of claim 1 in which said plate is a plastic disc with a peripheral bead on its upper surface and said gasket outer bead is disposed radially outwardly of said plate bead to be captured and held securely to said shoulder to provide a peripheral seal between said plate and said cup.

3. A safety pressure-vacuum relief cap for closing filler necks of vehicle tanks and the like comprising a fitting having a circular, upwardly facing flange extending concentrically about the axis of the fitting, a circular plate concentrically resting on said flange, said plate having a plurality of openings extending axially therethrough, each of said openings being disposed at least a first radial distance from the center of said plate, said plate also haveing at least one vacuum valve aperture extending axially therethrough at a radial distance from said plate center less than said first distance, an inverted cup providing a peripheral skirt having a concentric and peripherally extending shoulder above said flange, means for securing said fitting and cup against axial separation, an annular flexible gasket having an outer peripheral portion gripped between said plate and said shoulder and an inner peripheral bead engaging the upper surface of said plate in an annular area disposed between said first distance and said lesser distance, spring means acting against the radially inward region of said gasket to urge said gasket inner peripheral bead into yieldable sealing contact with the upper surface of said plate to provide a pressure valve for the tank, vacuum valve means normally closing said vacuum valve aperture to provide a vacuum valve for the tank, said fitting providing communication with the interior of the fuel tank, and an outer shell for said cup providing means for holding said cup and said fitting against axial separation, said cup and said shell being ported to provide communication with the atmosphere, and said outer shell providing means for closing engagement with the filler neck.

4. The invention of claim 3 in which the outer peripheral portion of said gasket is formed to provide a peripherally extending bead disposed between said shoulder and said plate to provide a peripheral seal between said plate and said cup.

5. The invention of claim 4 in which said plate is provided, at its radially outer portion, with an upwardly and peripherally extending bead in vertical registry with said shoulder and holding said gasket outer bead against said shoulder.

6. The invention of claim 3 in which said plate and cup are bonded together to secure the outer peripheral portion of said gasket therebetween.

* * * * *